Figure 1:
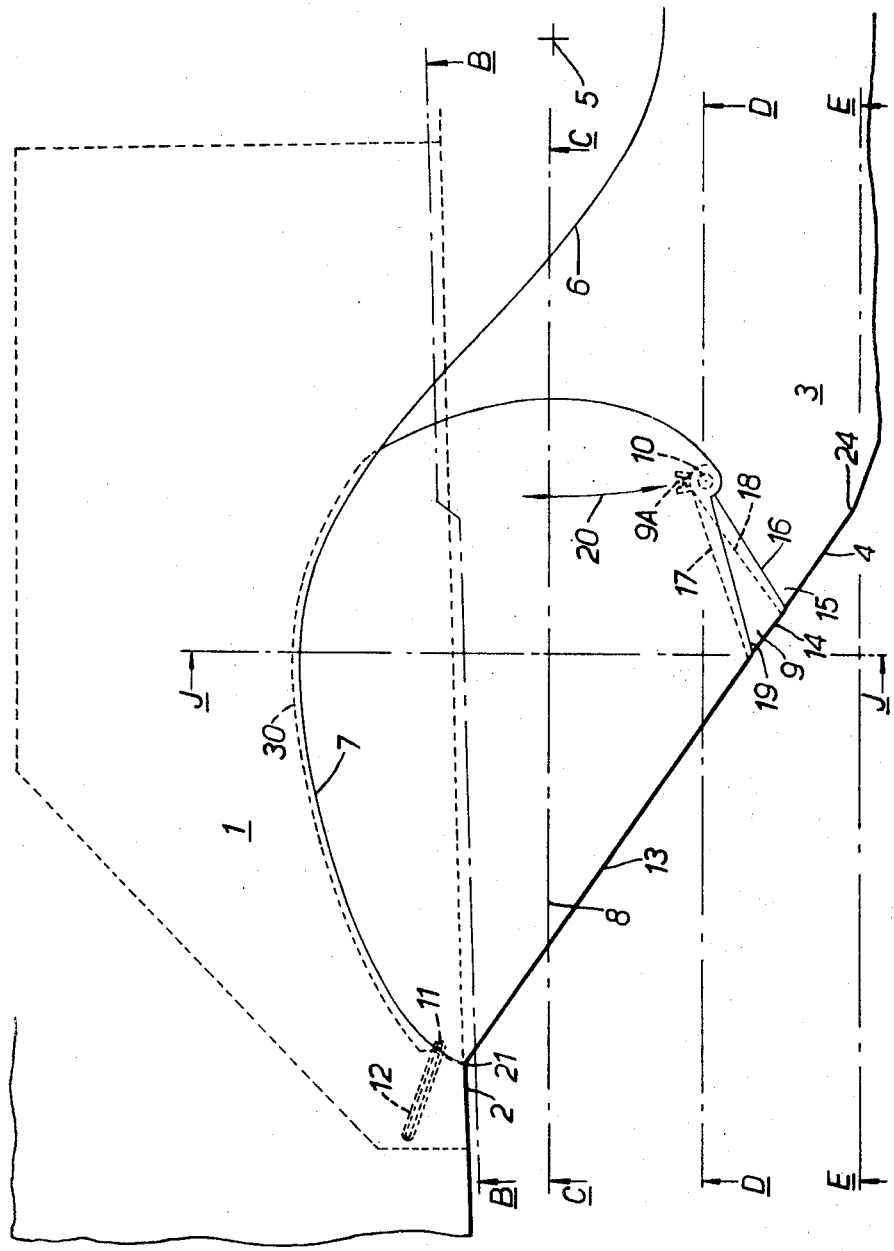

United States Patent [19]
Rhodes et al.

[11] 3,734,431
[45] May 22, 1973

[54] VARIABLE-GEOMETRY AIRCRAFT

[75] Inventors: Arthur Neville Rhodes; Denis Edward Blackburn, both of Fulwood, Preston, England

[73] Assignee: British Aircraft Corporation Limited, London, England

[22] Filed: May 25, 1970

[21] Appl. No.: 51,400

[30] Foreign Application Priority Data

May 27, 1969   Great Britain......................26,813/69

[52] U.S. Cl. ..........................244/49, 244/39, 244/46
[51] Int. Cl..................................................B64c 3/56
[58] Field of Search.........................244/7 A, 39, 46, 244/49, 17.27

[56] References Cited

UNITED STATES PATENTS

| | | | |
|---|---|---|---|
| 3,104,082 | 9/1963 | Polhamus | 244/49 |
| 3,510,088 | 5/1970 | Bird | 244/46 |

FOREIGN PATENTS OR APPLICATIONS

| | | | |
|---|---|---|---|
| 1,909,835 | 4/1968 | Germany | 156/46 R |

*Primary Examiner*—Benjamin A. Borchelt
*Assistant Examiner*—J. V. Doramus
*Attorney*—Cushman, Darby & Cushman

[57] ABSTRACT

A variable-sweep-back-wing aircraft, each wing of which is provided in the junction between its leading edge and the fuselage with a wing root member formed in two portions, namely a nib lying adjacent to the fuselage and an eyelid lying intermediate between the nib and the wing, the nib and the eyelid both being pivoted to the wing about a common pivot which is parallel to the main wing pivot, and each being movable relatively to the wing and to the other, the nib and the eyelid together forming a continuation of the leading edge of the wing when the wing is in its fully-swept-back position, and the nib and the eyelid both lying wholly within the fuselage contour when the wing is in its outspread position of minimum sweep-back. The nib is also pivoted to the fuselage at a point spaced from its common pivot to the wing, by means of a pivot pin slidable in a track in the fuselage. During forward pivotal movement of the wing from its fully-swept-back position towards its outspread position, the initial movement of the wing causes the eyelid to pivot as one with the wing, while the nib is pivoted relatively to the wing and to the fuselage by the movement of the wing so as to partially enter the fuselage, while during continued pivotal movement of the wing in the same direction both the nib and the eyelid are carried into the fuselage by virtue of their connection to the wing.

4 Claims, 8 Drawing Figures

3,734,431

VARIABLE-GEOMETRY AIRCRAFT

The present invention relates to variable-geometry aircraft having variable sweep-back wings, and specifically to those aircraft having a leading edge root member on each wing movable with respect to the wing so that when the wings are in a highly swept-back configuration the movable root members form a continuation of the wing leading edges, and when the wings are in an outspread configuration the movable root members lie within the fuselage contour.

According to the present invention an aircraft of the type described has associated with each wing a leading edge root member formed in two portions, each movable relatively to the wing and to the other portion, said movable portions together forming a continuation of the wing leading edge when the wing is highly swept-back and both lying wholly within the fuselage contour when the wing is in an outspread position of reduced sweep-back.

In one arrangement, the said portions are of such a configuration and are so located and interconnected that on initial forward movement of the wing from the highly swept-back position the said portions move as one, and on continued forward movement of the wing towards the minimum sweep-back position the said portions move angularly relatively to one another into overlapping relationship within the fuselage contour.

During this latter stage of movement of the wing, one of the root members may move relatively to the wing whilst the other moves as one with the wing relatively to the other member.

Preferably the said root portions are pivoted to the wing at the same point, and one of said portions is pivoted to the fuselage by means of a pivot constrained to move along a fixed path within the fuselage.

Preferably also, the movement of the said portions is effected by the wing sweep movements only, and without the assistance of any additional jacks, motors or the like.

Figure 2:
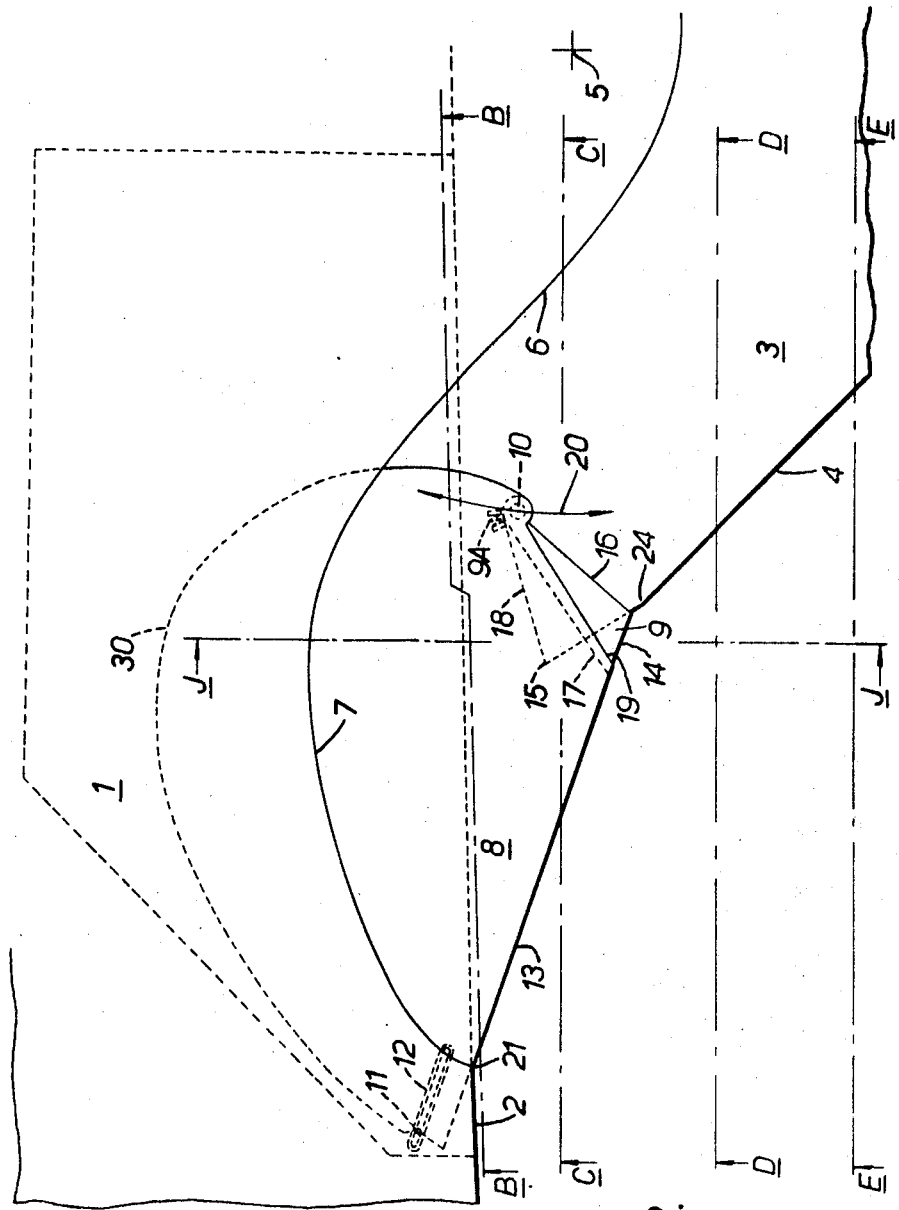
Figure 3:
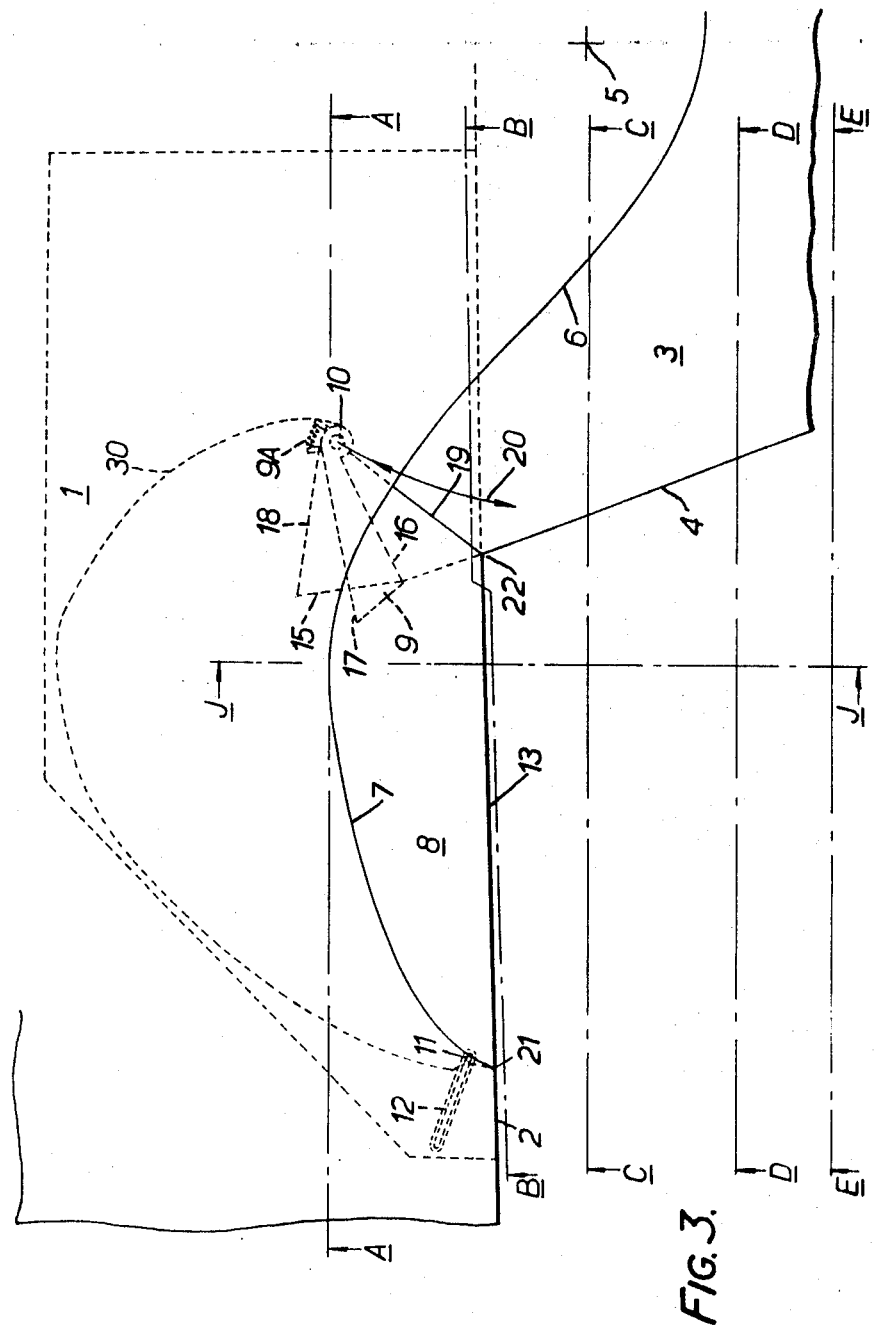
Figure 4:
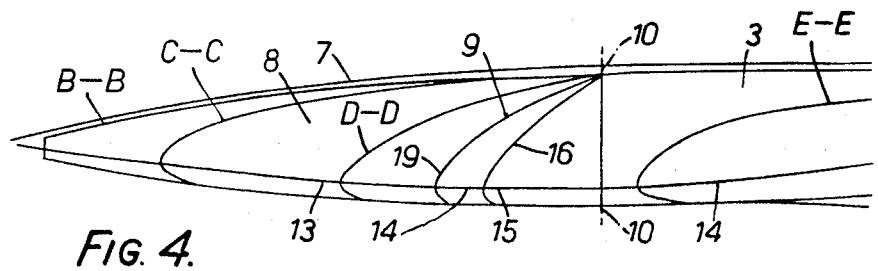
Figure 5:
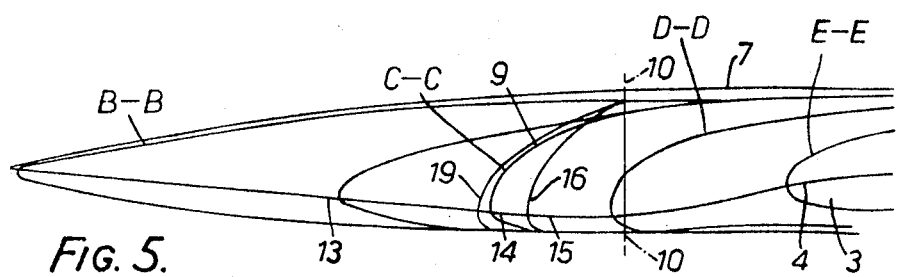
Figure 6:
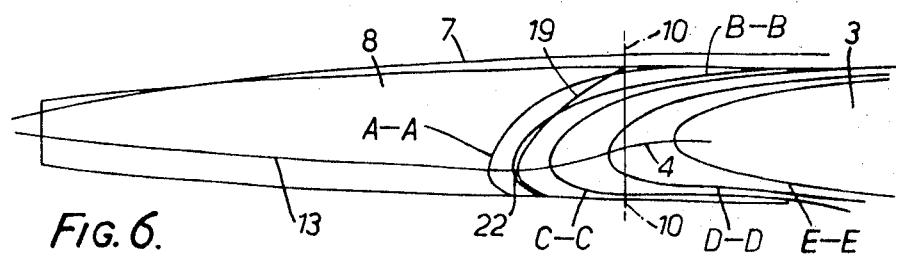
Figure 7:
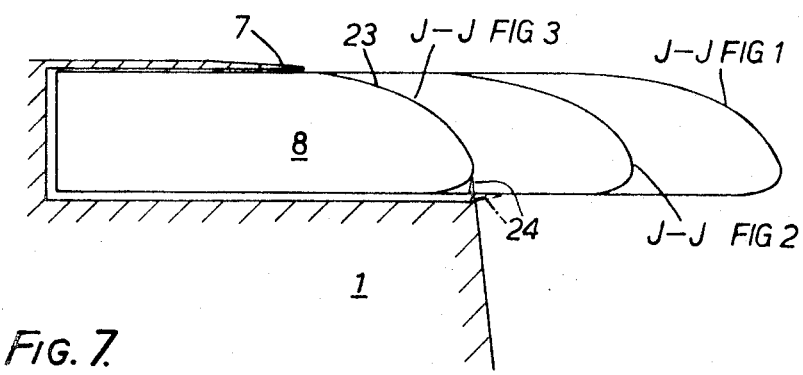

The invention may be carried into practice in various ways, but one specific embodiment will now be described by way of example only and with reference to the accompanying drawings, in which:

FIG. 1 shows a plan view of an aircraft wing root incorporating the invention with the wing in a position of maximum sweep-back, FIG. 2 is a similar view with the wing in an intermediate sweep-back position, FIG. 3 is a similar view but with the wing in a position of minimum sweep-back, FIG. 4 is a view on Arrow V of FIG. 1 showing in outline the profile of sections taken on lines B—B, C—C, D—D, and E—E of that Figure, FIG. 5 is a view on Arrow V of FIG. 2 showing in outline the profile of sections taken on lines B—B, C—C, D—D and E—E of that Figure, FIG. 6 is a view on Arrow VI of FIG. 3 showing in outline the profile of sections taken on lines A—A, B—B, C—C, D—D and E—E of that Figure, FIG. 7 is a composite sectional view incorporating sections taken on line J—J of FIGS. 1, 2 and 3, and FIG. 8 is a plan of an aircraft embodying the wing root construction of FIGS. 1 to 7 in both wings, the port wing being shown in the fully-swept-back wing position and the starboard wing in the outspread position.

The section lines B—B, C—C, D—D, E—E and J—J are located at identical stations in each of FIGS. 1, 2 and 3.

Figure 8:
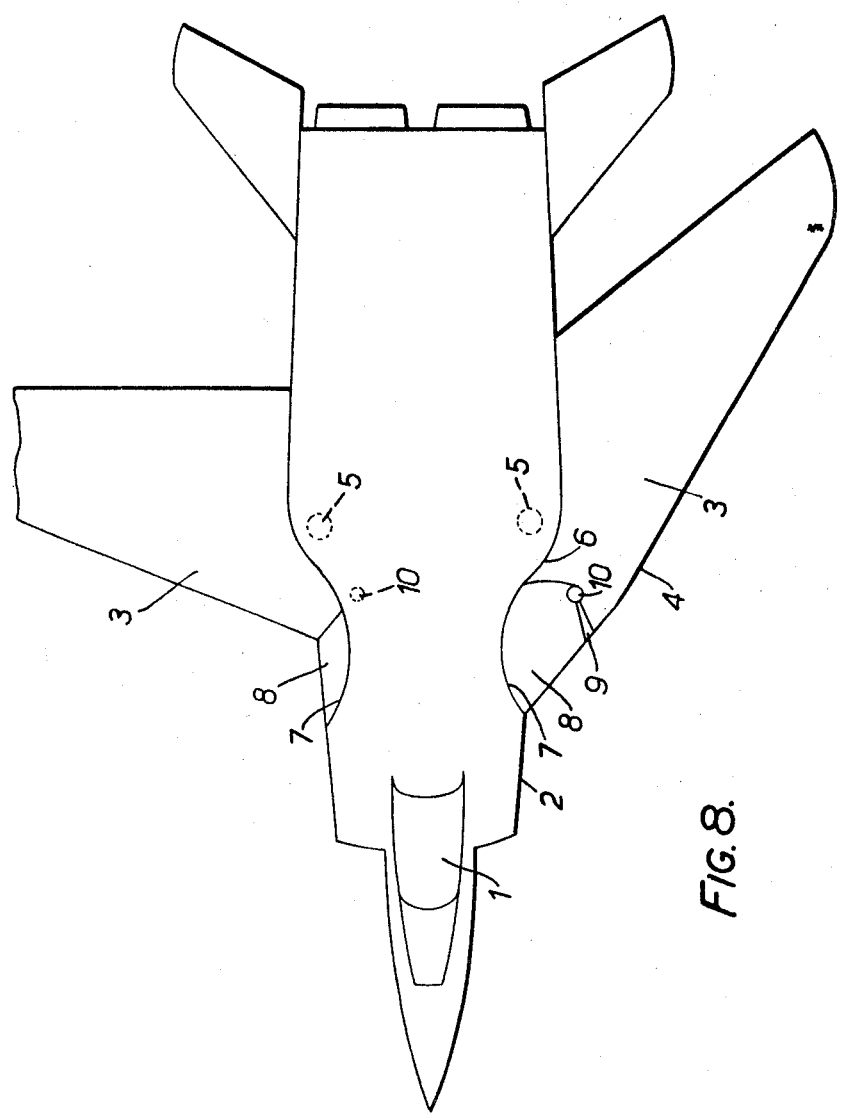

For clarity the invention is described and illustrated in FIGS. 1 to 7 with reference to only one wing (the port wing) of the aircraft shown in FIG. 8; it is of course applied similarly to both wings.

Referring initially to FIGS. 1, 2, 3, and 8 a variable sweep-back wing aircraft has a fuselage 1, the port side profile of which is shown at 2 in FIGS. 1 to 3, and wings 3, the leading edges of which are shown at 4. The port wing 3 is arranged to swing about a pivot 5 (FIGS. 2 and 3) mounted outboard of the fuselage 1 on a structure extending from the fuselage and smoothly covered by fairing 6. The pivot 5 may, as an alternative, be mounted within the fuselage. The upper fuselage skin is cut away at 7 in the vicinity of the wing root leading edge.

The wing 3 is provided with a first leading edge root portion 8 (hereinafter termed the nib) and a second leading edge root portion 9 (hereinafter termed the eyelid), both portions being pivoted to the wing 3 about a generally vertical pivot axis at 10. The nib 8 is also connected to the fuselage 1 by means of a pivot member 11 which is itself constrained to move bodily along a track 12 mounted in the fuselage.

The nib 8 and the eyelid 9 are movable about the pivot 10 both relatively to the wing and relatively to each other. The pivot 10, being mounted on the wing, is constrained to move in an arc 20 as the wing 3 swings about its pivot 5.

The nib 8 and the eyelid 9 are both of generally part-aerofoil shape in cross-section, having leading edges 13 and 14, respectively. Both the nib 8 and the eyelid 9 have at least partially hollow interiors. That of the eyelid 9 allows the inboard leading edge 15 of the wing to pass through it (see FIG. 2) whilst that of the nib 8 allows both the eyelid 9 and the inboard leading edge 15 of the wing to enter (see FIG. 3).

The eyelid 9 is spring-biased by spring means 9A so as to tend to remain in the position with respect to the nib 8 shown in FIG. 1 until positively urged to a different position.

As shown in FIG. 1, when the wing 3 is in a position of maximum sweep-back the inboard flank 18 of the wing remains just within outboard flank 16 of the eyelid 9 whilst the inboard flank 17 of the eyelid 9 remains just within the outboard or trailing flank 19 of the nib 8. Also in this wing position the inboard edge 30 of the nib 8 remains just within the line of the fuselage skin cut-away 7.

To reach an outspread position, assuming the wing 3 to be initially in the position of FIG. 1, that is to say in the position of maximum sweep-back, the wing is moved in a clockwise direction, as illustrated, about its pivot 5. The pivot 10 thus moves along arc 20 and, since both the nib 8 and the eyelid 9 are pivoted at 10 to the wing, they are both moved generally inboard and forward, but remain in the same position relative to one another by virtue of the spring means 9A until the position of FIG. 2 is reached. In this position, which is an intermediate sweep-back position, the inboard leading edge 15 and the inboard flank 18 of the wing extend entirely through the eyelid 9 and into the nib 8. The nib 8 has now pivoted in an anticlockwise direction (as shown) about its fuselage pivot 11 which has moved generally forward along its track 12 to accommodate the arcuate movement of the pivot 10.

Although the nib 8 rotates as described, the positioning of the track 12 is such that the leading edge 13 of the nib always passes through the fuselage skin at the same point 21. This arrangement simplifies the design of the fuselage/nib seals.

In FIG. 2 the wing leading edge 4 is shown as just contacting the outboard interior corner of the leading edge 14 of the eyelid 9. As the wing further rotates about its pivot 5, the eyelid 9 is urged away from its initial position with respect to the nib 8 by this contact with the rotating wing, and is carried by the wing leading edge 4 generally inboard into the interior of the nib 8. The pivot 10 continues to move along its arcuate path 20.

FIG. 3 shows the wing 3 in its position of minimum sweep. In this position the pivot 10 has reached its furthest inboard location along the path 20, the leading edge 13 of the nib 8 lies along the fuselage contour 2, and what was the outboard tip of the nib leading edge 13 has engaged the leading edge 4 of the wing 3 at 22. The eyelid 9 has been carried by the wing 3 well into the interior of the nib 8 and simultaneously the fuselage pivot point 11 of the nib has moved generally rearwards along its track 12.

It will be appreciated that these rotary movements of the eyelid 9 and nib 8 from their positions of FIG. 1 into their positions of FIG. 3 are caused entirely by their mechanically coupling with the forwardly swinging wing, and not by any auxiliary motors, jacks, etc.

The movement of the wing in the rearward direction from this outspread position to a position of increased sweep-back causes movements of the nib and the eyelid 9 which are in the exact opposite sequence to that described.

FIGS. 4, 5 and 6, being views on Arrows IV, V and VI of FIGS. 1, 2 and 3, respectively and on which profile lines of the various sections A—A, B—B, C—C, etc. have been superimposed, serve to show how the nib 8, the eyelid 9 and the wing 3 merge to provide a measure of leading edge droop which feature is found to be aerodynamically desirable on most swept-wing aircraft. These Figures also show how the aerofoil contours at various sections can be arranged, by local modification, to fit closely together to yield an effective wing root and fuselage junction.

FIG. 7, being a composite section taken on lines J—J of FIGS. 1, 2 and 3, illustrates the varying positions adopted by the nib 8 with respect to the fuselage 1. This Figure also shows how, in the position of FIG. 3 with the wing 3 in a position of minimum sweep-back, the upper surface 23 of the nib 8 forms part of the fuselage contour and how it merges with the cut-away skin line 7.

An effective but simple flexible seal 24 is affixed to the lip of the lower fuselage skin to contact the underside of the nib 8 in its various positions.

The starboard wing 3 of the aircraft is also provided with a nib and eyelid construction which is similar to and arranged similarly to that of the port wing, but is a mirror image thereof in plan.

An aircraft having variable-sweep-back wings as described and illustrated has the following advantages:

1. In the minimum sweep-back wing position the nib 8 and the eyelid 9 lie within the fuselage contours. Thus the wing has an uninterrupted leading edge which is not shielded by leading edge portions fixed to the fuselage, permitting the use of full-span leading edge high lift devices.

2. Elaborate, and therefore costly, seals between the nib 8 and the fuselage 1 are rendered unnecessary.

3. The nib 8 and the eyelid 9 can conveniently conform to locally modified wing root aerofoil sections such as the drooped leading edge illustrated.

4. The nib 8 and the eyelid 9 require no separate actuation gear and are operated entirely by wing sweep movements.

Although the wing leading edge 4 is shown in FIGS. 1 and 2 to have a kink 24, this is necessary only in the exact configuration illustrated. It would not be necessary, or even desirable, in alternative configurations according to the invention.

As illustrated, the plane of wing sweep movement is parallel to the fuselage fore-and-aft axis, that is to say the axes of the pivots 5 are "vertical" with respect to the fuselage axis (assumed horizontal) and parallel to each other. The invention is also applicable to embodiments where the plane of wing sweep movement of each wing is angled to the fuselage fore-and-aft axis and the axes of the pivots 5 are canted with respect to each other and to the fuselage.

However, in all cases the nib 8 must pivot in a plane perpendicular to the axis of the respective wing pivot 5.

What we claim as our invention and desire to secure by Letters Patent is:

1. An aircraft having a fuselage with variable-sweep-back wings, each movable in an associated plane of wing-sweep movement, each wing having a main wing portion pivoted to the fuselage and a two-portion root member at its leading edge, said root member being movable with respect to the main wing portion and to the fuselage so that when the wing is in a fully swept-back configuration the two root portions of the root member extend outside the fuselage to form together a continuation of the leading of the wing at its root, and when the wing is in a fully outspread configuration the said root portions lie within the fuselage contour, first pivot means pivoting a first of said root portions to the fuselage, and second pivot means pivoting both the said first root portion and the second of said root portions to the main wing portion, both said pivot means allowing pivotal movement about pivotal axes extending generally normally to the associated plane of wing sweep movement, the two root portions being of part-aerofoil shape with at least partially hollow interiors, the interior of the said first root portion being such as to allow the said second root portion and a part of the leading edge of the main wing portion to enter said interior, and the interior of the said second root portion being such as to allow a part of the leading edge of the main wing portion to extend through it, there being provided means for causing sweep movement of each main wing portions, and biasing means acting between the said first and second root portions to bias them pivotally towards their said positions extending outside the fuselage, and engagement means for causing engagement between the said second root portion and the main wing portion such that on initial forward sweep movement of the main wing portion from the fully swept-back configuration the said movement of the main wing portion acting through said second pivot means causes the said first and second root portions to move as one into the interior of the fuselage contour, pivoting relatively to the fuselage about said first pivot means and relatively to the main wing portion about said second pivot means, and during further forward sweep movement of the main wing portion towards the fully-outspread configuration the said engagement means engages the said second root portion with the main wing portion to cause the said second root portion to move as one with the main wing portion and relatively to the said first root portion against the action of the biasing means.

2. An aircraft according to claim 1 wherein the said first pivot means comprises a pivot member and a track in which the pivot member is slidably engaged for sliding movement along the track, the track being so located in the fuselage that the leading edge of the said first root portion intersects the fuselage contour at substantially the same location throughout the wing sweep movement.

3. An aircraft according to claim 1 wherein the biasing means comprises a spring acting directly between the said first and second root portions.

4. An aircraft according to claim 1 wherein the engagement means comprises a member located in the interior of the second root portion and a co-operating member located on the exterior of the main wing portion.

* * * * *